(12) United States Patent
Hornischer et al.

(10) Patent No.: US 11,007,879 B2
(45) Date of Patent: May 18, 2021

(54) METHOD FOR OPERATING A MOTOR VEHICLE AND MOTOR VEHICLE

(71) Applicant: AUDI AG, Ingolstadt (DE)

(72) Inventors: Jörg Hornischer, Wettstetten (DE); Roberth Eichner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 254 days.

(21) Appl. No.: 16/037,216

(22) Filed: Jul. 17, 2018

(65) Prior Publication Data
US 2019/0135130 A1 May 9, 2019

(30) Foreign Application Priority Data
Nov. 6, 2017 (DE) ...................... 10 2017 219 675.0

(51) Int. Cl.
B60L 15/20 (2006.01)
B60W 30/18 (2012.01)
(Continued)

(52) U.S. Cl.
CPC ......... *B60L 15/2063* (2013.01); *B60W 10/08* (2013.01); *B60W 10/18* (2013.01); *B60W 30/18063* (2013.01); *B60W 30/18118* (2013.01); *B60W 50/082* (2013.01); *B60W 50/085* (2013.01); B60L 2250/26 (2013.01); B60L 2250/30 (2013.01); *B60W 2540/10* (2013.01); *B60W 2540/12* (2013.01);
(Continued)

(58) Field of Classification Search
CPC .......... B60L 15/2063; B60L 2250/26; B60L 2250/30; B60W 50/085; B60W 10/18; B60W 10/08; B60W 30/18118; B60W 50/082; B60W 30/18063; B60W 2540/21; B60W 2540/215; B60W 2552/15; B60W 2710/083; B60W 2540/10; B60W 2540/12
See application file for complete search history.

(56) References Cited

U.S. PATENT DOCUMENTS 3,725,921 A * 4/1973 Weidman ............. B60K 31/045
342/71
5,394,949 A * 3/1995 Wright .................... E21B 7/006
175/121
(Continued)

FOREIGN PATENT DOCUMENTS

BR 6600979 U * 2/1988
DE 102 00 991 A1 7/2002
(Continued)

OTHER PUBLICATIONS

European Search Report dated Apr. 3, 2019, in connection with corresponding EP Application No. 118181076.3 (12 pgs., including machine-generated English translation).

(Continued)

Primary Examiner — Behrang Badii
Assistant Examiner — Jalal C Coduroglu
(74) Attorney, Agent, or Firm — Maier & Maier, PLLC

(57) ABSTRACT

A method for operating a motor vehicle including a traction electric motor, wherein the traction electric motor can be actuated for producing a creep torque that brings about a slow movement of the motor vehicle, wherein a plurality of creep torques of different magnitude can be set by a user of the motor vehicle.

4 Claims, 1 Drawing Sheet

(51) Int. Cl.
*B60W 50/08* (2020.01)
*B60W 10/18* (2012.01)
*B60W 10/08* (2006.01)

(52) U.S. Cl.
CPC ... *B60W 2540/21* (2020.02); *B60W 2540/215* (2020.02); *B60W 2552/15* (2020.02); *B60W 2710/083* (2013.01)

(56) References Cited

U.S. PATENT DOCUMENTS

| | | | | |
|---|---|---|---|---|
| 5,957,001 | A * | 9/1999 | Gualtieri | B60K 31/00 200/61.88 |
| 6,600,979 | B1 * | 7/2003 | Kumar | B60T 8/172 180/197 |
| 6,602,162 | B2 * | 8/2003 | Quast | B60K 31/042 477/108 |
| 6,826,469 | B2 * | 11/2004 | Iwata | B60W 10/04 701/93 |
| 6,905,438 | B2 * | 6/2005 | Suzuki | B60W 10/06 477/5 |
| 7,099,766 | B2 * | 8/2006 | Michi | B60K 31/0008 123/352 |
| 7,313,914 | B1 * | 1/2008 | Reid | F16H 61/437 60/487 |
| 7,451,845 | B2 * | 11/2008 | Lankes | B60K 31/00 180/170 |
| 8,041,460 | B2 * | 10/2011 | Klinger | B60H 1/00985 700/277 |
| 8,078,382 | B2 * | 12/2011 | Sugano | B60W 10/06 701/96 |
| 8,382,638 | B2 * | 2/2013 | Erbguth | F02D 41/123 477/4 |
| 8,577,575 | B2 * | 11/2013 | Tomura | F02N 11/0833 701/70 |
| 8,838,339 | B2 * | 9/2014 | Riepold | G01L 5/221 701/42 |
| 9,008,924 | B2 * | 4/2015 | Jackson | B60W 10/113 701/53 |
| 9,028,015 | B2 * | 5/2015 | Klusemann | B60T 13/74 303/192 |
| 9,174,642 | B2 * | 11/2015 | Wimmer | B60W 30/143 |
| 9,182,759 | B2 * | 11/2015 | Wimmer | G06F 3/0484 |
| 9,265,187 | B2 * | 2/2016 | Cavender-Bares | G05D 1/0088 |
| 9,327,721 | B2 * | 5/2016 | Johri | B60W 30/20 |
| 9,499,154 | B2 * | 11/2016 | Marfatia | B60W 10/02 |
| 9,862,370 | B2 * | 1/2018 | Sasaki | B60W 30/18063 |
| 9,914,454 | B2 * | 3/2018 | Simmons | B60W 10/06 |
| 10,006,994 | B2 * | 6/2018 | Chan | A01C 7/102 |
| 10,011,352 | B1 * | 7/2018 | Dahlstrom | B64C 39/024 |
| 10,030,598 | B2 * | 7/2018 | Gennard | F02D 41/10 |
| 10,137,869 | B2 * | 11/2018 | Korte | B60T 7/042 |
| 10,549,756 | B2 * | 2/2020 | Pursifull | B60W 30/18109 |
| 2003/0216215 | A1 * | 11/2003 | Suzuki | B60L 50/16 477/5 |
| 2012/0071296 | A1 * | 3/2012 | Miyamoto | B60W 10/18 477/27 |
| 2012/0231926 | A1 * | 9/2012 | Erbguth | B60L 7/26 477/93 |
| 2015/0224976 | A1 * | 8/2015 | Wang | B60W 10/08 701/22 |
| 2016/0016469 | A1 * | 1/2016 | Yamada | B60W 30/17 701/22 |
| 2016/0339918 | A1 * | 11/2016 | Aoyama | F02D 29/02 |
| 2016/0355165 | A1 * | 12/2016 | Forster | B60T 1/005 |
| 2017/0042081 | A1 * | 2/2017 | Zumbach | G01N 1/08 |
| 2017/0129605 | A1 * | 5/2017 | Wu | B64D 1/18 |
| 2017/0174202 | A1 * | 6/2017 | Sasaki | B60W 30/18063 |
| 2018/0032042 | A1 * | 2/2018 | Turpin | B64C 39/024 |
| 2018/0174290 | A1 * | 6/2018 | Yoshida | B64C 39/024 |
| 2019/0030475 | A1 * | 1/2019 | Witchey | G06K 9/4604 |
| 2019/0073003 | A1 * | 3/2019 | Xu | G02B 6/0038 |
| 2019/0135130 | A1 * | 5/2019 | Hornischer | B60W 50/082 |
| 2020/0037491 | A1 * | 2/2020 | Schoeny | A01B 79/005 |
| 2020/0307528 | A1 * | 10/2020 | Xu | B60T 7/122 |

FOREIGN PATENT DOCUMENTS

| | | | |
|---|---|---|---|
| DE | 102 21 835 A1 | 12/2003 | |
| DE | 10 2009 037 182 A1 | 2/2011 | |
| DE | 102009056160 A1 * | 6/2011 | B60W 50/085 |
| DE | 10 2012 015 617 A1 | 2/2014 | |
| DE | 10 2012 015 872 A1 | 5/2014 | |
| DE | 10 2015 210 696 A1 | 1/2016 | |
| DE | 10 2016 116 328 A1 | 3/2017 | |
| DE | 10 2016 201 348 A1 | 8/2017 | |
| EP | 0 375 162 A2 | 11/1989 | |
| EP | 1342610 A2 * | 9/2003 | B60L 15/20 |
| EP | 1 359 336 A1 | 11/2003 | |
| EP | 2431243 A1 * | 3/2012 | B60W 10/08 |
| EP | 3 213 972 A1 | 9/2017 | |
| FR | 2 825 327 A1 | 12/2002 | |
| JP | 2016211151 A * | 12/2016 | |
| JP | 6600979 B2 * | 11/2019 | H01R 4/38 |
| KR | 20080037437 A * | 4/2008 | |
| KR | 20120071296 A * | 7/2012 | |
| KR | 101787660 B1 * | 10/2017 | |
| NL | 6600979 A * | 8/1966 | H01R 4/38 |
| WO | WO-2009101331 A1 * | 8/2009 | B60W 30/18118 |
| WO | WO-2011064322 A2 * | 6/2011 | B60W 20/11 |
| WO | 2014/188103 A1 | 11/2014 | |

OTHER PUBLICATIONS

Examination Report dated Apr. 25, 2018 of corresponding German application No. 10 2017 219 675.0; 6 pgs.

* cited by examiner

METHOD FOR OPERATING A MOTOR VEHICLE AND MOTOR VEHICLE

FIELD

The invention relates to a method for operating a motor vehicle comprising a traction electric motor, wherein the traction electric motor can be actuated for producing a creep torque that brings about a slow movement of the motor vehicle. The invention further relates to a motor vehicle.

BACKGROUND

Drivers of vehicles that have an internal combustion engine as well as an automatic transmission are accustomed to a certain behavior of the vehicle in regard to starting and stopping. Said behavior includes, for example, so-called creep, that is, the presence of a creep torque when the accelerator pedal is not actuated and the brakes are released, which results in slow travel of the motor vehicle. In such vehicles, said creep torque may arise owing to the operating principle of the automatic transmission. Different methods are known from the prior art for reproducing or preventing such creep.

Thus, DE 102 00 991 A1 shows a clutch device with an improved creep function, which can bring about a creep operation in which a substantially smaller torque is transmitted from a drive shaft to a driven shaft of the motor vehicle. In this case, the creep function provided by the clutch mechanism can be deactivated and reactivated, wherein it is programmed in such a way that it can emit a reactivation signal only when the presence of a driver is detected in the motor vehicle.

DE 10 2012 015 872 A1 discloses a method for controlling a creep mode in vehicles having an electric motor. In this case, the creep mode can be activated via an accelerator pedal signal or a brake pedal signal. When the creep mode is activated, the vehicle moves from standstill without the accelerator pedal being actuated thereby. The locomotion from creep mode can be controlled via the brake pedal.

In DE 10 2016 116 328 A1, improvements in connection with a creep torque are proposed. In this case, a system for providing an electric creep in a vehicle with a manual transmission is proposed. For this purpose, the vehicle comprises an electric motor for supplying a drive force of low speed for the vehicle as well as a control unit, which is configured for the purpose of switching off the internal combustion engine when the electric creep function is activated. The activation of the electric creep function can be reversed by actuation of an accelerator pedal or a clutch pedal.

SUMMARY

The invention is based on the object of presenting, by way of contrast, an improved method for operating a motor vehicle.

In order to achieve this object, it is provided in accordance with the invention that a plurality of creep torques of different magnitude can be adjusted by a user of the motor vehicle.

This makes it possible advantageously to adjust the behavior of the motor vehicle to the expectations or the preferences of a driver. In this way, for a vehicle with an electric drive, it is possible to reproduce the accustomed behavior of a conventional motor vehicle operated with an internal combustion engine having an automatic transmission. It is possible thereby for the driver to adjust various creep torques of different magnitude. The magnitude of the adjusted creep torque thereby determines how fast the vehicle moves when the accelerator pedal is not actuated. In this case, it is possible that individual creep torques of different magnitude are specified, from which the driver can choose or adjust a magnitude or else a range between a minimum creep torque and a maximum creep torque can be specified, within which the driver can set any desired creep torque. Obviously, it can also be provided that the driver can switch off the creep function and consequently can choose that no creep torque is to be produced.

The creep torque can be produced, for example, by actuation of the traction motor when the accelerator pedal is not actuated. For this purpose, the motor vehicle can comprise a control device that is designed to actuate the traction motor for producing a slow movement of the motor vehicle. In this case, the actuation occurs in such a way that the magnitude of the creep torque set by the driver of the motor vehicle is produced.

In accordance with the invention, it can be provided that, when a setting condition is met and when a creep torque is present, the creep torque is deactivated when a brake system of the motor vehicle is actuated. The setting condition can be met or not met, wherein this can be adjusted by a driver of the motor vehicle. Therefore, the driver can consequently choose whether he would like to activate or to deactivate the function. When a setting condition is met, that is, when a function is activated, the creep torque is deactivated if a creep torque is present and when the brake system of the motor vehicle is actuated. An actuation of the brake system can, for example, be present if the driver activates a brake pedal and/or a parking brake. An actuation of the brake system of the motor vehicle can likewise be present when one wheel brake or a plurality of wheel brakes and/or the parking brake of the motor vehicle is or are activated automatically by a driver assistance system. This makes it possible advantageously to deactivate the creep torque, that is, to suppress the slow movement of the motor vehicle, while an actuation of the brake system of the motor vehicle is present. In this way, when there is only a single, brief actuation of the brake pedal or of a parking brake, the vehicle stops moving due to the creep torque and does not need to be kept at standstill in opposition to the creep torque through a steady actuation of the brake pedal or of the parking brake. Therefore, through a single actuation of the brake system, the motor vehicle can be prevented from drifting further forward in a traffic jam or at a red light, for example, by a deactivation of the creep torque when the setting condition is met, that is, when this function has been activated by the driver of the motor vehicle.

Furthermore, in accordance with the invention, it can be provided that, in addition, at least one brake of the brake system of the motor vehicle is activated. This makes it possible that, even after only a single actuation of the brake system, at least one brake of the brake system of the motor vehicle remains steadily activated, so that the vehicle is prevented from rolling away. For this purpose, one wheel brake or a plurality of the wheel brakes and/or the parking brake of the motor vehicle can be activated. In this way, it is ensured that, after an actuation of the brake system of the motor vehicle, the vehicle does not autonomously move, either owing to a creep torque or owing to the motor vehicle rolling away accidentally, so that, after a single actuation of the brake system, the vehicle is present in an autohold function, which holds it at a standstill.

In accordance with the invention, it can be provided that, if need be, when an additional setting condition is met, both depending on inclination information that describes the inclination of the vehicle, and depending on status information that describes an operating state of the motor vehicle, at least one brake of the brake system of the motor vehicle is activated. The additional setting condition, if need be, can be met or not met, wherein it is met when the driver of the motor vehicle undertakes a corresponding setting, that is, an activation of the function. When this setting condition is met and, furthermore, when the inclination information describes a currently existing inclination of the vehicle, then at least one brake of the brake system of the motor vehicle is activated when the status information that describes an operating state of the motor vehicle includes, for example, the fact that the vehicle is no longer moving forward or only is still moving forward at a speed produced by a creep torque, and/or there is no actuation of an accelerator pedal of the motor vehicle. In this way, when stopping on a hill, the vehicle is prevented from rolling backward accidentally, because it is held at a standstill through the activation of the at least one brake of the brake system.

In accordance with the invention, it can be provided that, when an accelerator pedal of the motor vehicle is actuated, the activated brake is deactivated. In this way, the automatic holding of the motor vehicle at a standstill is terminated and the vehicle can move in accordance with the actuation of the accelerator pedal.

In a preferred embodiment of the invention, it is provided that the magnitude of the creep torque and/or the setting condition and/or, if need be, the additional setting condition can be set by a user of the motor vehicle via a user interface of the motor vehicle. In this case, a user of the motor vehicle, such as, for example, the driver, can adjust the vehicle behavior to his expectations and his preferences. He can set various magnitudes of the creep torque or activate the creep torque, and/or activate the autohold function by meeting the setting condition, and/or, when a vehicle inclination is present, can activate a prevention of backward rolling by meeting, if need be, the additional setting condition.

For the user interface, it can be provided in accordance with the invention that the user interface comprises at least one binary switch and/or one selector switch and/or one touchscreen and/or one speech recognition device. In this case, a binary switch can be shifted between two switching states, as a result of which a setting condition is met or is not met, that is, a function can be activated or deactivated. A selector switch makes possible, in contrast, more than two switching states, so that, for example, it is possible via a selector switch to choose between different magnitudes of the creep torque. It is also possible for the activation or deactivation of the functions and/or the setting of the creep torque to occur via a touchscreen and/or via a speech recognition device.

For a motor vehicle according to the invention, it is provided that the motor vehicle comprises a traction electric motor, wherein the motor vehicle is equipped for carrying out a method according to the invention.

BRIEF DESCRIPTION OF THE DRAWINGS

Further advantages and details of the invention ensue from the exemplary embodiments as well as on the basis of the drawings. Shown are.

DETAILED DESCRIPTION

Figure 1:
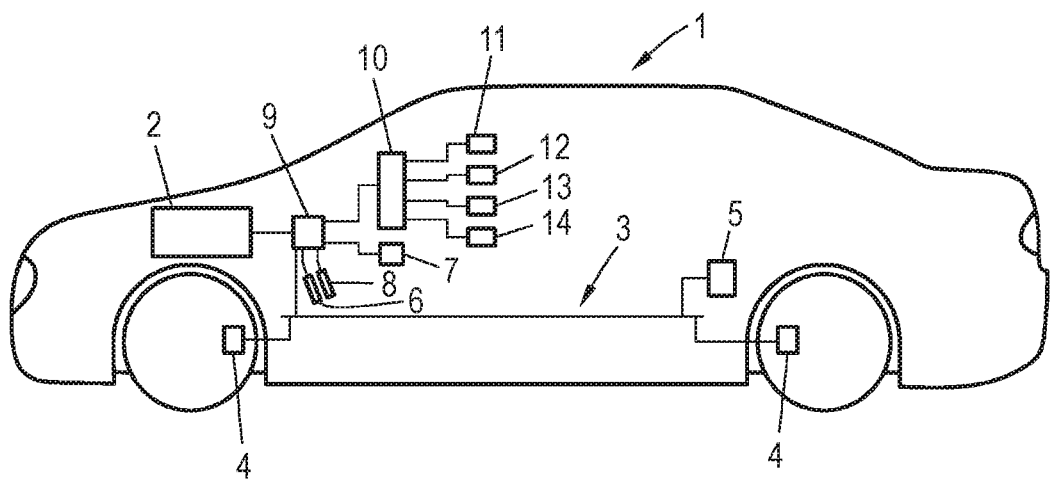
FIG. 1 a schematic side view of a motor vehicle according to the invention.

Illustrated in FIG. 1 is a schematic side view of a motor vehicle 1 according to the invention. The motor vehicle 1 comprises a traction electric motor 2, which serves for driving the motor vehicle 1. Furthermore, the motor vehicle 1 comprises a brake system 3, which comprises wheel brakes 4, each of which is arranged at a wheel of the motor vehicle 1, as well as a parking brake 5, which is arranged at a rear axle of the motor vehicle 1. An actuation of the brake system 3, which results in an activation of the wheel brakes 4, can be carried out via a brake pedal 6. For manual actuation of the parking brake 5, furthermore, a handbrake lever 7 can be provided.

The traction electric motor 2 can be controlled via an accelerator pedal 8. Provided for carrying out a method according to the invention is a control device 9, which, for example, can be designed as part of a motor control device. The motor vehicle 1 comprises, furthermore, a user interface 10, which, for activation of functions and/or for setting the magnitude of a creep torque, comprises one binary switch or a plurality of binary switches 11 and/or a selector switch 12. Additionally or alternatively to this, an activation of functions and/or a setting of the magnitude of a traction element can also occur via a touchscreen 13 of the interface 10 and/or via a speech recognition device 14 of the user interface 10.

Through an actuation of the traction electric motor 2 by the control device 9, it is possible, regardless of the setting made by a user of the motor vehicle 1, to produce a creep torque, which brings about a slow movement of the motor vehicle 1. In this case, a setting of the magnitude of the creep torque can be made via the user interface 10 of the motor vehicle.

Figure 2:
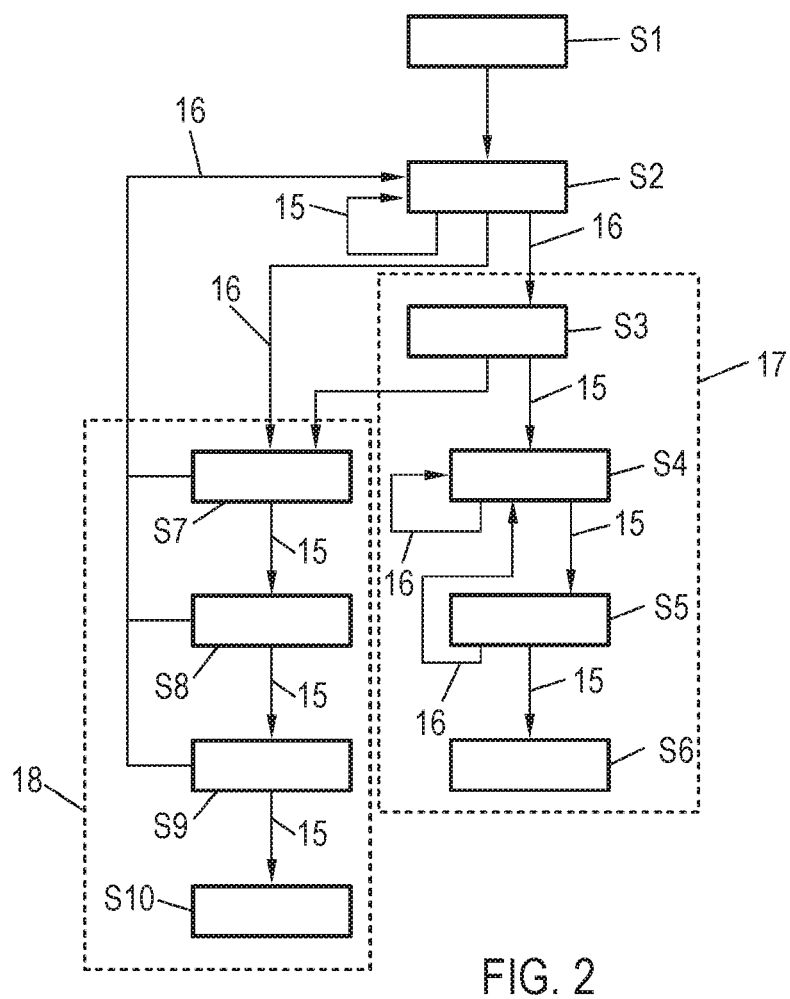
FIG. 2 a flow chart of a method according to the invention.

Illustrated in FIG. 2 is a flow chart of an exemplary embodiment of a method according to the invention. The steps presented represent the following:

| | |
|---|---|
| S1 | start |
| S2 | checking actuation of the accelerator pedal |
| S3 | activation of the creep torque |
| S4 | checking actuation of the brake system |
| S5 | checking the setting condition |
| S6 | deactivation of the creep torque |
| S7 | checking the additional setting condition |
| S8 | checking the inclination information |
| S9 | checking the status information |
| S10 | activation of the brake system |

The method starts in step S1 when the operation of the motor vehicle begins. The beginning of the operation may take place, for example, when an ignition or a starting button or the equivalent is actuated.

In step S2, it is checked in an ongoing manner during operation whether an actuation of the accelerator pedal is present. If this is the case, then, as indicated by the yes arrow 15, the ongoing checking proceeds to check whether an actuation of the accelerator pedal 8 is present. If no actuation of the accelerator pedal 8 exists, then, as indicated by the no arrow 16, the checking proceeds with step S3 in a first branch 17 of the method.

In step S3, there occurs an activation of the creep torque depending on the magnitude set by the driver. If a set magnitude of the creep torque is present, then the checking proceeds with step S4.

In step S4, the operation of the motor vehicle occurs due to the creep torque. The motor vehicle 1 consequently moves slowly forward because of the creep torque produced by the traction motor 2. During step S4, it is checked in an ongoing manner whether an actuation of the brake system 3 is present. An actuation of the brake system 3 can occur, for example, if the driver actuates the brake pedal 6 and/or the handbrake lever 7. If no such actuation of the brake system 3 is present, then, as indicated by the arrow 16, the condition of step S4 is checked in an ongoing manner. If an actuation of the brake system 3 is present, then the checking proceeds with step S5.

In step S5, it is checked whether the setting condition is met. The setting condition is met when the driver has activated the corresponding autohold function via the user interface 10 of the motor vehicle 1. If the setting condition is not met or if the function is deactivated, then the creep torque is not deactivated and the checking proceeds with step S4. If the setting condition is met, then, in step S6, the deactivation of the creep torque is produced. Optionally, in addition, it is possible here to also provide in step S6 a steady activation of the brake system 3 when there is only a single actuation of the brake system 3. A deactivation of a brake system 3 that has been activated in a steady manner in such a way takes place in this case as soon as the accelerator pedal 8 is actuated.

In addition to the first branch 17 of the method, which describes an autohold function, a second branch 18 can be provided, which can be laid out in parallel to the branch 17.

If, in step S2, no actuation of an accelerator pedal is present, then, in the second branch 18, it is possible to proceed with step S7. Likewise, it is possible to proceed with step S7 if it has been established in step S3 that no creep torque is present or if a creep torque with a magnitude of zero is set. In step S7, it is checked whether the additional setting condition is met. This setting condition is met when the driver has activated the corresponding function, that is, the function of automatic holding on a hill described by the second branch 18. If this additional setting condition is met, then the checking proceeds with step S8. In step S8, it is checked whether the inclination information, which describes an inclination of the motor vehicle, describes a currently existing inclination of the motor vehicle. For this purpose, it is possible to check, for example, whether the inclination of the motor vehicle exceeds a given threshold. If this is the case, then, in step S9, it is subsequently checked whether the status information includes the fact that the vehicle is no longer moving forward or else is moving forward only at a speed produced by a creep torque. Furthermore, the status information can also describe whether an actuation of the accelerator pedal 8 is present. When no actuation of the accelerator pedal 8 is present and the motor vehicle is not moving or is moving only at a slow speed, then, in step S10, the activation of the brake system 3 occurs. A backward rolling of the motor vehicle 1 on a slope is thereby prevented. Subsequently, the method proceeds with the actuation of the accelerator pedal 8 in step S2. The method likewise proceeds in step S2 when one of the conditions checked in step S7, step S8, or step S9 is checked as not being met. In this case also, the method proceeds in step S2.

Obviously, it is possible for a method according to the invention to comprise only one of the two branches 17, 18.

The invention claimed is:

1. A method for operating a motor vehicle comprising:
   actuating a traction electric motor of the electric vehicle to generate a creep torque that brings about a slow movement of the motor vehicle absent input from an accelerator pedal,
   wherein a plurality of creep torques of different magnitude are selectable by a user of the motor vehicle through a user interface of the motor vehicle that is separate from the accelerator pedal,
   wherein generation of the creep torque is deactivated until reactivated through the user interface when a first setting condition is met and a brake system of the motor vehicle is actuated,
   wherein, generation of the creep torque is deactivated and at least one brake system of the motor vehicle is activated when a second setting condition is met and depending on inclination information that describes a vehicle inclination and status information that describes an operating state of the motor vehicle,
   wherein the status information that describes an operating state of the motor vehicle comprises at least one of a lack of forward movement of the motor vehicle and a movement of the motor vehicle solely due to the creep torque.

2. The method according to claim 1, wherein in that the activated brake is deactivated when the accelerator pedal of the motor vehicle is actuated.

3. The method according to claim 1, wherein the first setting condition and/or the second setting condition can be set by a user of the motor vehicle via the user interface of the motor vehicle.

4. The method according to claim 1, wherein the user interface comprises at least one binary switch and/or one selector switch and/or one touchscreen and/or one speech recognition device.

* * * * *